(12) United States Patent
Kidder et al.

(10) Patent No.: US 8,800,288 B2
(45) Date of Patent: Aug. 12, 2014

(54) SYSTEM FOR REDUCING VIBRATIONAL MOTION IN A GAS TURBINE SYSTEM

(71) Applicant: General Electric Company, Schenectady, NY (US)

(72) Inventors: Kyle Lee Kidder, Greenville, SC (US); Marcus Byron Huffman, Simpsonville, SC (US); Stephen Wayne Tilley, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/671,435

(22) Filed: Nov. 7, 2012

(65) Prior Publication Data

US 2014/0123658 A1    May 8, 2014

(51) Int. Cl.
F02C 7/24 (2006.01)

(52) U.S. Cl.
USPC ............................................. 60/725

(58) Field of Classification Search
USPC .................. 60/725, 737, 740, 39.37, 772
See application file for complete search history.

(56) References Cited

U.S. PATENT DOCUMENTS

| | | | | |
|---|---|---|---|---|
| 4,122,674 A * | 10/1978 | Andersson et al. | ............. | 60/725 |
| 5,733,103 A | 3/1998 | Wallace et al. | | |
| 8,272,224 B2 * | 9/2012 | Cihlar et al. | ................... | 60/796 |
| 8,443,611 B2 * | 5/2013 | Belsom et al. | ................... | 60/772 |
| 2005/0076644 A1 * | 4/2005 | Hardwicke et al. | ............. | 60/772 |
| 2008/0041058 A1 * | 2/2008 | Johnson et al. | ................. | 60/725 |
| 2008/0053097 A1 * | 3/2008 | Han et al. | ........................ | 60/737 |
| 2010/0011769 A1 * | 1/2010 | Gambacorta et al. | ........... | 60/725 |
| 2010/0293952 A1 * | 11/2010 | Jain et al. | ........................ | 60/725 |
| 2011/0179795 A1 * | 7/2011 | Johnson et al. | ................. | 60/725 |
| 2012/0180500 A1 * | 7/2012 | DiCintio | ......................... | 60/796 |
| 2013/0042619 A1 * | 2/2013 | Bobba et al. | .................... | 60/725 |
| 2013/0074501 A1 * | 3/2013 | Tiwary et al. | ................... | 60/725 |

* cited by examiner

*Primary Examiner* — Phutthiwat Wongwian
(74) *Attorney, Agent, or Firm* — Fletcher Yoder, P.C.

(57) ABSTRACT

A system, including a combustor cap assembly, including a first plate configured to divide a combustion chamber from a head end chamber of a combustor, a first sleeve disposed about the first plate, and a first stiffening rib coupled to the combustor cap assembly, wherein the combustor cap assembly is configured to mount in a combustor, and the first stiffening rib is configured to damp vibration caused by combustion dynamics in the combustor.

19 Claims, 6 Drawing Sheets

SYSTEM FOR REDUCING VIBRATIONAL MOTION IN A GAS TURBINE SYSTEM

BACKGROUND OF THE INVENTION

The subject matter disclosed herein relates to gas turbine engines and, more specifically, to a system for reducing vibrational motion in a gas turbine engine.

Gas turbine engines include a combustor for creating energy by combusting a fuel-air mixture. The gas turbine engine converts this energy into rotational motion that drives loads or creates thrust. The combustion of the fuel-air mixture can create flow disturbances and acoustic pressure waves. These flow disturbances and acoustic pressure waves may result in oscillations of gas turbine components. The oscillations in the gas turbine components may be referred to as combustion dynamics. Combustion dynamics may create life limiting oscillations in the gas turbine components at specific frequencies (e.g., resonant frequencies).

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, a system including a combustor cap assembly configured to mount in a combustor, the combustor cap assembly comprising, a first plate, a second plate axially offset relative to the first plate, a first fuel nozzle sleeve extending through the first and second plates, a first sleeve extending circumferentially around the first and second plates, a second sleeve extending circumferentially around the first sleeve at a radial offset from the first sleeve, a support structure extending radially between the first and second sleeves, and a first stiffening rib coupled to the combustor cap assembly, wherein the first stiffening rib is configured to damp resonant motion caused by combustion dynamics in the combustor.

In another embodiment, a system including, a combustor cap assembly, including a first plate configured to divide a combustion chamber from a head end chamber of a combustor, a first sleeve disposed about the first plate, and a first stiffening rib coupled to the combustor cap assembly, wherein the combustor cap assembly is configured to mount in a combustor, and the first stiffening rib is configured to damp vibration caused by combustion dynamics in the combustor.

In another embodiment, a method including, injecting a fuel from a first fuel nozzle into a combustion chamber of a combustor, wherein the first fuel nozzle is supported by a combustor cap assembly disposed between the combustion chamber and a head end of the combustor, combusting the fuel in the combustion chamber of the combustor, and reducing resonant motion of the combustor cap assembly caused by combustion dynamics associated with combusting the fuel using at least one stiffening rib coupled to the combustor cap assembly, wherein the at least one stiffening rib is tuned to at least one resonant frequency of the combustor cap assembly.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
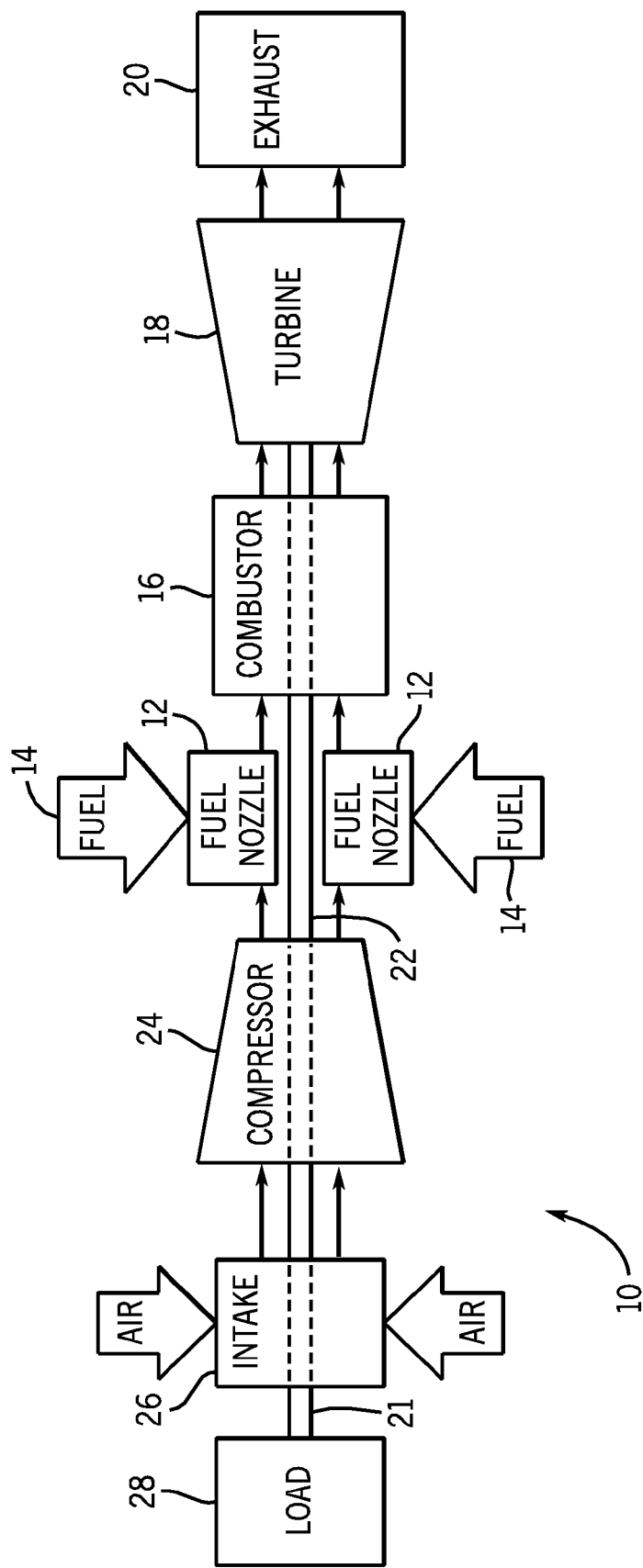
FIG. 1 is a block diagram of an embodiment of a gas turbine.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is generally directed towards a gas turbine system with stiffening ribs or segments that reduce or eliminate life limiting vibrations in a combustor cap assembly. In operation, the gas turbine system combusts air and fuel in a combustor that may cause life limiting vibrations in the combustor cap assembly. More specifically, the combustion of the air-fuel mixture creates pressure waves and flow disturbances (e.g., combustion dynamics) that contact gas turbine components causing vibrations. The pressure waves and flow disturbances may change depending on the operating state of the gas turbine system (e.g., startup, shutdown, steady state). The vibration of gas turbine components, resulting from the combustion dynamics, may cause damage if gas turbine components vibrate excessively (e.g., vibrate at resonant frequencies) during different operational states. The embodiments below describe stiffening ribs or segments that may increase a gas turbine component(s) resistance to damaging vibrations at different gas turbine operating states. The stiffening ribs or segments may be modified in various ways to provide the proper amount of stiffness at the right locations. The disclosed embodiments include continuous or segmented stiffening ribs that can be formed from different materials and/or cross-sectional shapes, and that can be placed in different locations in the combustor cap assembly. The material, cross-sectional shape, and placement location of the continuous or segmented stiffening rib may vary, depending on the extent and location of the vibration in the combustor cap assembly. Thus, by selecting appropriate locations, materials, and shapes for the continuous or segmented stiffening ribs, the combustor cap assembly may reduce life limiting vibrations at different gas turbine operating states (e.g., startup, shutdown, steady state).

FIG. 1 is a block diagram of an embodiment of a turbine system 10 having a stiffening rib in a combustor cap assembly that reduces life limiting vibrational mode shapes caused by combustion of fuel in the combustor. The turbine system 10 may use liquid or gas fuel, such as natural gas and/or a hydrogen rich synthetic gas, to run the turbine system 10. As depicted, a plurality of fuel nozzles 12 intakes a fuel supply 14, mixes the fuel with air, and distributes the air-fuel mixture into a combustor 16. The air-fuel mixture combusts in a chamber within combustor 16, thereby creating hot pressurized exhaust gases. The combustion of the air-fuel mixture may create flow disturbances and acoustic pressure waves (e.g., combustion dynamics) that cause vibrations in gas turbine components. These vibrations (i.e., caused by combustion dynamics) may create life limiting vibrations (e.g., resonant vibrations) at different gas turbine system 10 operating states (e.g., startup, shutdown, steady state). The combustor 16 directs the exhaust gases through a turbine 18 toward an exhaust outlet 20. As the exhaust gases pass through the turbine 18, the gases force one or more turbine blades to rotate a shaft 22 along an axis of the system 10. As illustrated, the shaft 22 may be connected to various components of turbine system 10, including a compressor 24. The compressor 24 also includes blades that may be coupled to the shaft 22. As the shaft 22 rotates, the blades within the compressor 24 also rotate, thereby compressing air from an air intake 26 through the compressor 24 and into the fuel nozzles 12 and/or combustor 16. The shaft 22 may also be connected to a load 28, which may be a vehicle or a stationary load, such as an electrical generator in a power plant or a propeller on an aircraft, for example. As will be understood, the load 28 may include any suitable device capable of being powered by the rotational output of turbine system 10.

In operation, air enters the turbine system 10 through the air intake 26 and may be pressurized in the compressor 24. The compressed air may then be mixed with gas for combustion within combustor 16. For example, the fuel nozzles 12 may inject a fuel-air mixture into the combustor 16 in a suitable ratio for optimal combustion, emissions, fuel consumption, and power output. The combustion generates hot pressurized exhaust gases, which then drive one or more blades within the turbine 18 to rotate the shaft 22 and, thus, the compressor 24 and the load 28. The rotation of the turbine blades causes a rotation of shaft 22, thereby causing blades within the compressor 22 to draw in and pressurize the air received by the intake 26.

Figure 2:
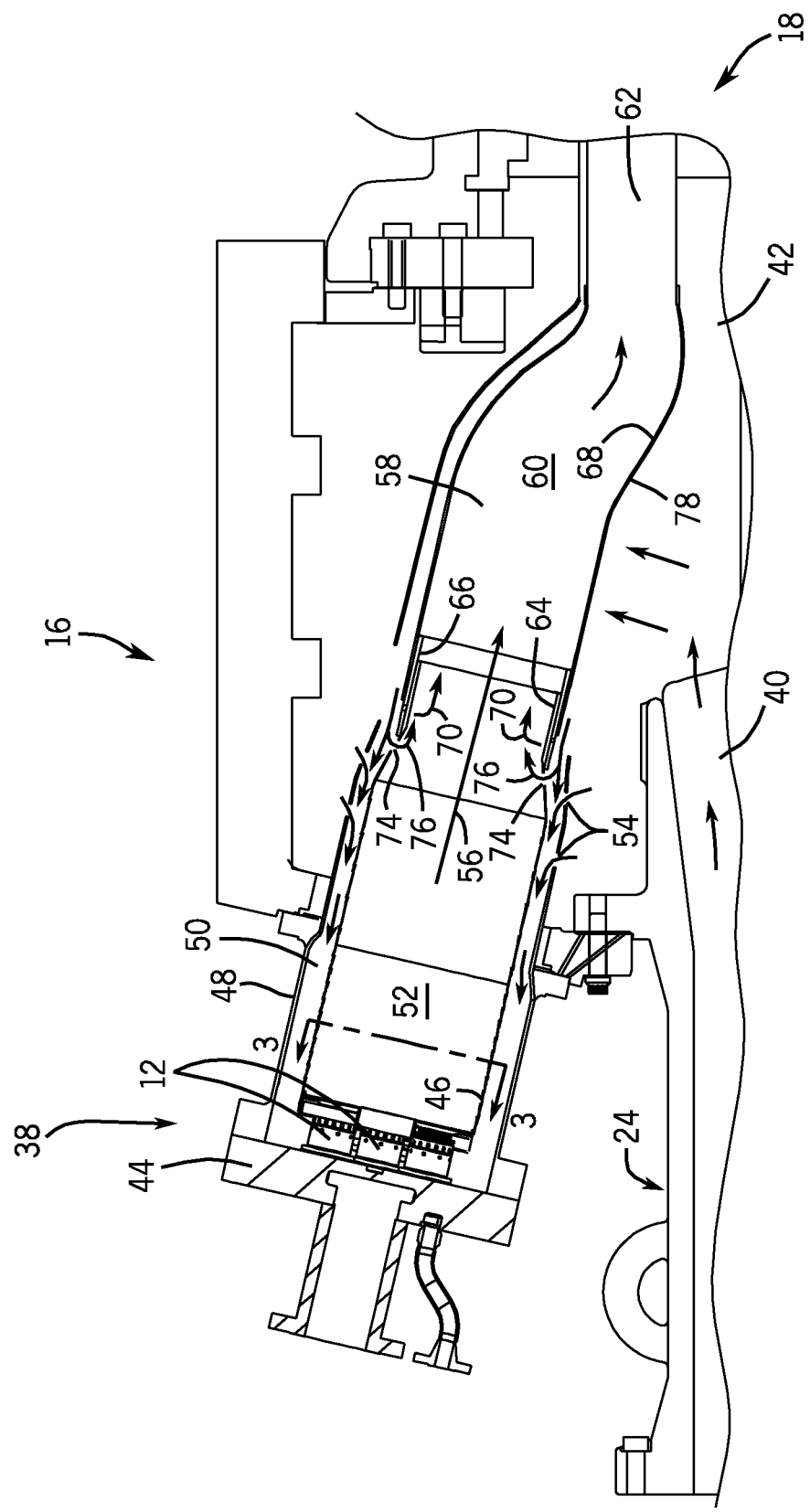
FIG. 2 is a cross-sectional view of an embodiment of a combustor having a combustor cap assembly.

FIG. 2 is a cross-sectional view of an embodiment of a combustor 16 having a combustor cap assembly 38 with a stiffening rib (100, seen in FIG. 3) that reduces life limiting vibrations. As will be appreciated, the combustor 16 is generally fluidly coupled to the compressor 24 and the turbine 18. The compressor 24 may include a diffuser 40 and a discharge plenum 42 that are coupled to each other in fluid communication to facilitate the channeling of compressed air to the combustor cap assembly 38. In the illustrated embodiment, the combustor 16 includes a cover plate 44 at the upstream head end of the combustor 16. The cover plate 44 may at least partially support the fuel nozzles 12 within the combustor cap assembly 38, and may provide a path through which air and fuel are directed to the fuel nozzles 12.

The combustor 16 includes a combustor liner 46 disposed within a flow sleeve 48. The arrangement of the liner 46 and the flow sleeve 48, as shown in FIG. 2, is generally concentric and may define an annular passage 50. In certain embodiments, the flow sleeve 48 and the liner 46 may define a first or upstream hollow annular wall of the combustor 16. The interior of the liner 46 may define a substantially cylindrical or annular combustion chamber 52. The flow sleeve 48 may include a plurality of inlets 54, which provide a flow path for at least a portion of the air from the compressor 24 into the annular passage 50. In other words, the flow sleeve 48 may be perforated with a pattern of openings to define a perforated annular wall.

As used herein, the terms "upstream" and "downstream" shall be understood to relate to the flow of combustion gases inside the combustor 16. For example, a "downstream" direction refers to the direction 56 in which a fuel-air mixture combusts and flows from the fuel nozzles 12 through a transition piece 58 towards the turbine 18, and an "upstream" direction refers to a direction opposite the downstream direction, as defined above.

An interior cavity 60 of the transition piece 58 generally provides a path by which combustion gases from the combustion chamber 52 may be directed through a turbine nozzle 62 and into the turbine 18. In the depicted embodiment, the transition piece 58 may be coupled to the downstream end of the liner 46 (with respect to direction 56), generally about a downstream end portion 64 (coupling portion). An annular wrapper 66 and a seal may be disposed between the downstream end portion 64 and the transition piece 58. The seal may secure the outer surface of the wrapper 66 to the inner surface 68 of the transition piece 58. Further, as mentioned above, the inner surface of the wrapper 66 may define passages that receive a portion of the airflow from the diffuser 40.

As discussed above, the turbine system 10, in operation, may intake air through the air intake 26. The compressor 24, which is driven by the shaft 22, rotates and compresses the air. The compressed air is discharged into the diffuser 40, as indicated by the arrows shown in FIG. 2. The majority of the compressed air is further discharged from the compressor 24, by way of the diffuser 40, through a plenum 42 and into one or more combustors 16. The air in the annular passage 50 is then channeled upstream (e.g., in the direction of combustor cap assembly 38) such that the air flows over the transition piece 58 and the downstream end portion 64 of the liner 46. In the illustrated embodiment, the airflow provides forced convection cooling of the transition piece 58 and the liner 46. In certain embodiments, the downstream end portion 64 of the liner 46 may include a plurality of film cooling holes to provide a film cooling flow 70 and/or by-pass openings 74 to provide a cooling flow 76 into the combustion chamber 52. The remaining airflow in the annular passage 50 is then channeled upstream towards the fuel nozzles 12, wherein the air is mixed with fuel 14 and ignited within the combustion chamber 52. As explained above, the combustion of the fuel-air mixture may vibrate some or all of the components in the combustor cap assembly 38. These vibrations may create life limiting mode shapes in components of the combustor cap assembly 38 at different operating states (e.g., startup, shutdown, steady state). Accordingly, the combustor cap assembly 38 may include a stiffening rib(s) that stiffens a component or components in the combustor cap assembly 38. The addition of the stiffening rib(s) may reduce or eliminate the life limiting mode shape vibration and extend operating life.

Figure 3:
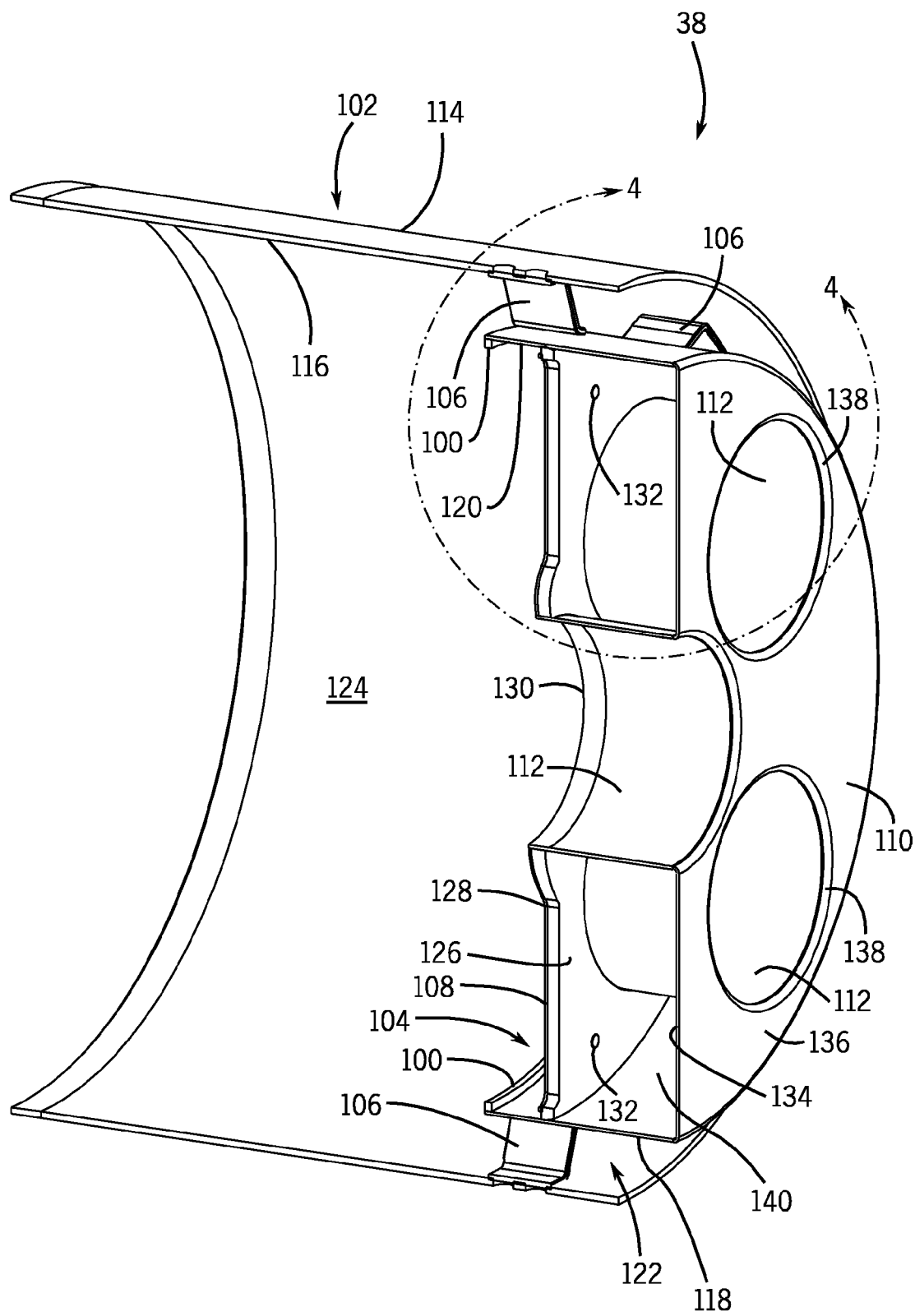
FIG. 3 is a perspective cutaway view of an embodiment of the combustor cap assembly with a stiffening rib.

FIG. 3 is a perspective cutaway view of an embodiment of the combustor cap assembly 38 with a stiffening rib 100. The stiffening rib 100 may increase vibrational resistance to combustion dynamics by tuning out resonant frequency vibrations or increasing the overall strength (i.e., stiffness) in the combustor cap assembly 38 as a whole and/or its individual components. Specifically, the stiffening rib 100 may be formed into different shapes; formed out of different materials; placed in different locations; be continuous or segmented; be annular; etc. The combustor cap assembly 38 includes an annular stiffening rib 100, an annular outer sleeve 102, an annular inner sleeve 104, spacers 106 (e.g., support structure), rear plate 108, front plate 110, and annular fuel nozzle sleeves 112. As illustrated, the outer sleeve 102 defines an outer surface 114 and an inner surface 116. The inner sleeve 104 likewise defines an outer surface 118 and an inner surface 120. The spacers 106 connect to and separate the inner surface 116 of the outer sleeve 102 from the outer surface 118 of the inner sleeve 104 creating a space 122. The space 122 allows air to pass between the outer sleeve 102 and the inner sleeve 104 into the chamber 124 (e.g., head end chamber) for use by the fuel nozzles. The inner sleeve 104 provides support for and connects to the rear plate 108 and the front plate 110 (i.e., the combustor cap). The rear plate 108 defines a front face 126, a rear face 128, fuel nozzle apertures 130, and cooling apertures 132. The front plate 110 defines a rear face 134, front face 136, and fuel nozzle apertures 138. The apertures 130 and 138 enable fuel nozzle sleeves 112 to communicate through the front plate 110 and the rear plate 108. The fuel nozzle sleeves 112 receive fuel nozzles that create a fuel-air mixture for combustion downstream in the combustor 16. As illustrated, the rear plate 108 includes cooling apertures 132. The apertures 132 may enable cooling air to pass through the rear plate 108 and into a cavity 140 between the front plate 110 and the rear plate 108. As the air passes through the apertures 132 it impinges against the rear surface 134 of the front plate 110 and provides a cooling effect on the front plate 110 and around the fuel nozzle sleeves 112.

Figure 4:
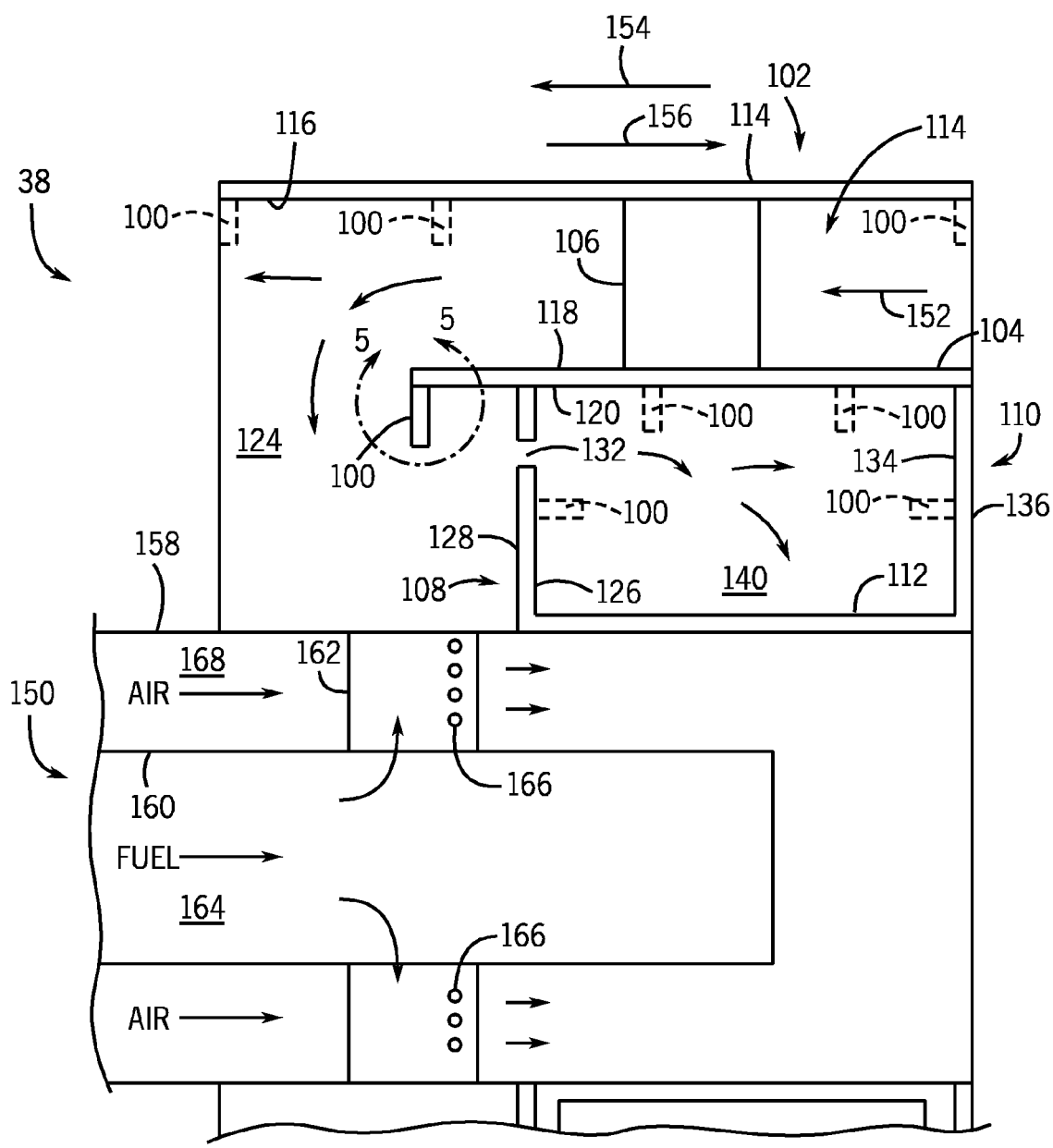
FIG. 4 is a schematic partial cross-sectional view of an embodiment of the combustor cap assembly with a stiffening rib.

FIG. 4 is a schematic partial cross-sectional view of an embodiment of the combustor cap assembly 38 with a stiffening rib 100. As illustrated, the stiffening rib 100 may be placed on many different components in the combustor cap assembly 38, thereby changing the stiffness of various components in the combustor cap assembly to increase vibrational resistance to life limiting vibrations. As illustrated, a fuel nozzle 150 is supported within the sleeve 112. The fuel nozzle 150 combines fuel and air to create a fuel air mixture that combusts in the combustor 16. In operation, the compressed air 152 passes, in upstream direction 154, through the space 122 between the outer sleeve 102 and the inner sleeve 104 and into the chamber 124. After entering the chamber 124, the air 152 cools the front plate 110 and provides air for the fuel nozzles 150. The air 152 cools the front plate 110 and fuel nozzle sleeve 112 by passing through apertures 132 in the rear plate 108. As the air 152 passes through the apertures 132, in the downstream direction 156, it enters the cavity 140 between the front plate 110 and the rear plate 108. Once inside the cavity 140, the air 152 contacts the front plate 110 and flows around the fuel nozzle sleeves 112. In this manner, air 152 cools components in close proximity to the combustor zone (i.e., where the fuel-air mixture combusts).

The fuel nozzle 150 uses air 152 to create the fuel-air mixture. The fuel nozzle 150 includes an outer shell 158, an inner fuel shell 160, and swirl vanes 162. The outer shell 158 is supported within the fuel nozzle sleeve 112 and encloses the fuel shell 160 and swirl vanes 162. The swirl vanes 162 surround the fuel shell 160 and enable mixing of fuel and air passing through the fuel nozzle 150. As illustrated, fuel passes through the fuel shell 160 in a fuel path 164. The fuel passes through the fuel shell 160 and into the swirl vanes 162, where the fuel exits through fuel ports 166. The air 152 in chamber 124 enters the fuel nozzle 150 in an upstream direction 154 before flowing through the fuel nozzle 150 in a downstream direction 156. The air 152 flows through the fuel nozzle 150 in annular space 168 between the outer shell 158 and the fuel shell 160. As the air 152 continues to flow through the fuel nozzle 150, it passes between the swirl vanes 162 and mixes with fuel exiting the fuel ports 166. This creates the fuel-air mixture that then exits the fuel nozzle 150 and combusts in the combustor 16. The combustion of the fuel-air mixture creates the hot and fast moving combustion gases that power the system 10.

As explained above, the combustion of the fuel-air mixture creates flow disturbances and acoustic pressure waves (e.g., combustion dynamics). The flow disturbances and acoustic pressure waves may result in vibrations of components in the combustor cap assembly 38. The vibration of the components (i.e., caused by combustion dynamics) may result in life limiting vibrations (e.g., resonant frequencies) at specific combustion operating states (e.g., startup, shutdown, steady state). Advantageously, the combustor cap assembly 38 includes the stiffening rib 100 attached to the inner sleeve 104. The stiffening rib 100 may be attached or formed in different ways to include welding; machining the inner sleeve 104 with the stiffening rib 100; casting the inner sleeve 104 with the stiffening rib 100; and forming the rib 100 by folding/bending the inner sleeve 104. The stiffening rib 100 provides additional vibrational resistance in the combustor cap assembly 38. The stiffening rib 100 may therefore prevent excessive vibrations of the inner sleeve 104 that may damage other components (i.e., the front plate 110, rear plate 108, sleeve 112, etc.) in the combustor cap assembly 38.

As illustrated, the combustor cap assembly 38 includes at least one stiffening rib 100 on the inner sleeve 104. In some embodiments, there may be additional stiffening ribs 100 (e.g., 1, 2, 3, 4, 5, 10, 15, or more) placed in different locations in the combustor cap assembly 38 (e.g., on the surfaces of the rear plate 108, the front plate 110, the inner sleeve 104, and/or the outer sleeve 102), as shown in phantom lines in FIG. 4. The stiffening ribs 100 may be sized, spaced, or positioned in a manner tuned to the combustion dynamics or to stiffen against damaging vibrations in specific regions (i.e., areas most susceptible to resonant frequencies and vibration). For example, the inner sleeve 104 may benefit from more stiffness than other components in the combustor cap assembly 38. Accordingly, the inner sleeve 104 may include 2, 3, 4, 5, 6, 7, or more stiffening ribs 100 to resist excessive vibration. As illustrated, the inner sleeve 104 may have multiple ribs 100 at different axial positions (e.g., a rearmost location, a middle location, and a front most location), in order to tune and/or stiffen at specific locations. In contrast, other components (e.g., the rear plate 108, the front plate 110, and/or the outer sleeve 102) may not benefit from additional stiffness and may, therefore, have limited numbers of stiffening ribs 100 or no stiffening ribs 100. In other embodiments, the stiffening ribs 100 may differ in material from one another, because some components may benefit from more stiffening with or without increasing the number of stiffening ribs 100. For example, the inner sleeve 104 may experience more damaging vibrations than other components. Therefore, the stiffening rib(s) 100 on the inner sleeve 104 may be formed from a stiffer material than the stiffening ribs 100 on the outer sleeve 102, the front plate 110, or the rear plate 108. In this manner, the stiffening provided by the stiffening rib(s) 100 may be tailored, so that individual components or the overall combustor cap assembly 38 may resist damaging vibrations.

Figure 5:
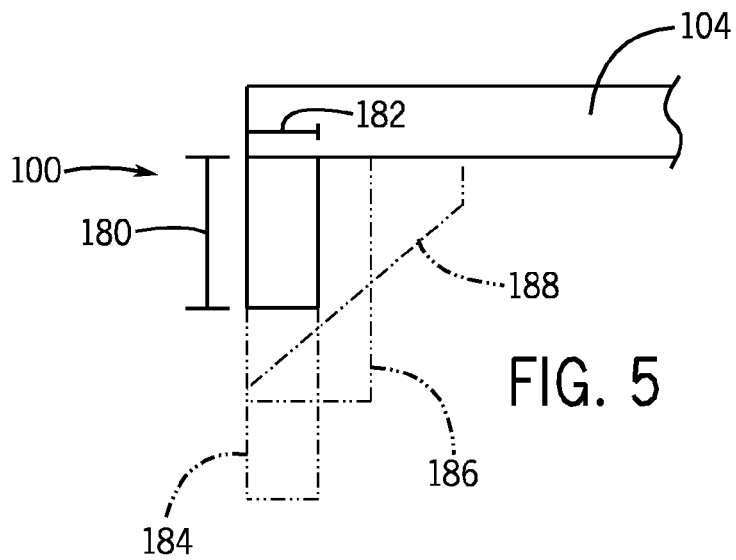
FIG. 5 illustrates a schematic cross-sectional view of a stiffening rib with different shapes.

FIG. 5 illustrates different cross-sectional shapes of the stiffening rib 100. Different cross-sectional shapes may be selected to optimize the stiffness (i.e., increase stiffness, decrease stiffness) of the stiffening ribs 100 to prevent life limiting vibration in the combustor cap assembly 38. Also, the stiffening rib 100 may increase vibrational resistance to combustion dynamics by tuning out resonant frequency vibrations in the combustor cap assembly 38 as a whole and/or its individual components. As illustrated, the cross-section of the stiffening rib 100 defines a height 180 and a width 182. The dimensions 180 and 182 or the shape in general may be varied depending on the embodiment and the stiffening needs of the particular combustor cap assembly 38. For example, in some embodiments, a taller rectangular stiffening rib 184 may be produced by increasing the height 180 while keeping the width 182 the same. In other embodiments, a larger and thicker stiffening rib 186 may be used, in which the height 180 and the width 182 are larger than that shown for the stiffening rib 100. In still other embodiments, the stiffening rib 100 may be a trapezoidal stiffening rib 188 or another kind of shape (e.g., square, semi-circular, triangular, etc.). Accordingly, the combustion cap assembly 38 may utilize different locations of the stiffening rib 100, different numbers of stiffening ribs 100, and/or different cross-sectional shapes of stiffening rib 100, to improve the stiffness and/or tune out resonant vibration frequencies, thereby extending the life of components in the combustor cap assembly 38.

Figure 6:
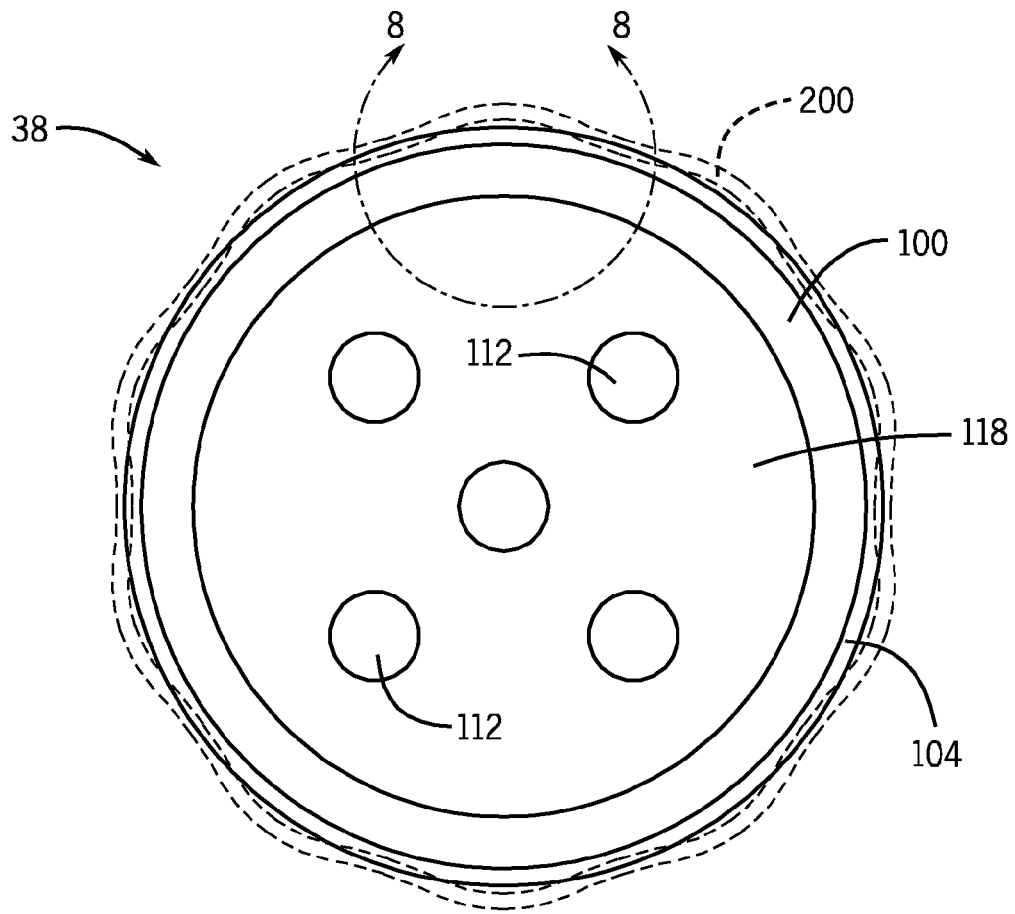
FIG. 6 is a schematic rear view of the combustor cap assembly with a continuous annular stiffening rib and vibrational mode shapes.

FIG. 6 is a rear view of the combustor cap assembly 38 with a continuous annular stiffening rib 100. The stiffening rib 100 may be annular and extend all the way around the inner sleeve 104. As illustrated, the cap assembly 38 may experience combustion dynamics that create life limiting vibrational mode shapes 200 without the disclosed embodiments of stiffening ribs 100. These vibrational mode shapes 200 may damage components in the combustor cap assembly 38. Some combustion operations frequencies may cause resonance in some or all of the components in the combustor cap assembly 38. The stiffening rib 100 increases the stiffness in the combustor cap assembly 38 enabling the combustor cap assembly 38 to resist or eliminate resonance and its damaging vibrational mode shapes 200.

Figure 7:
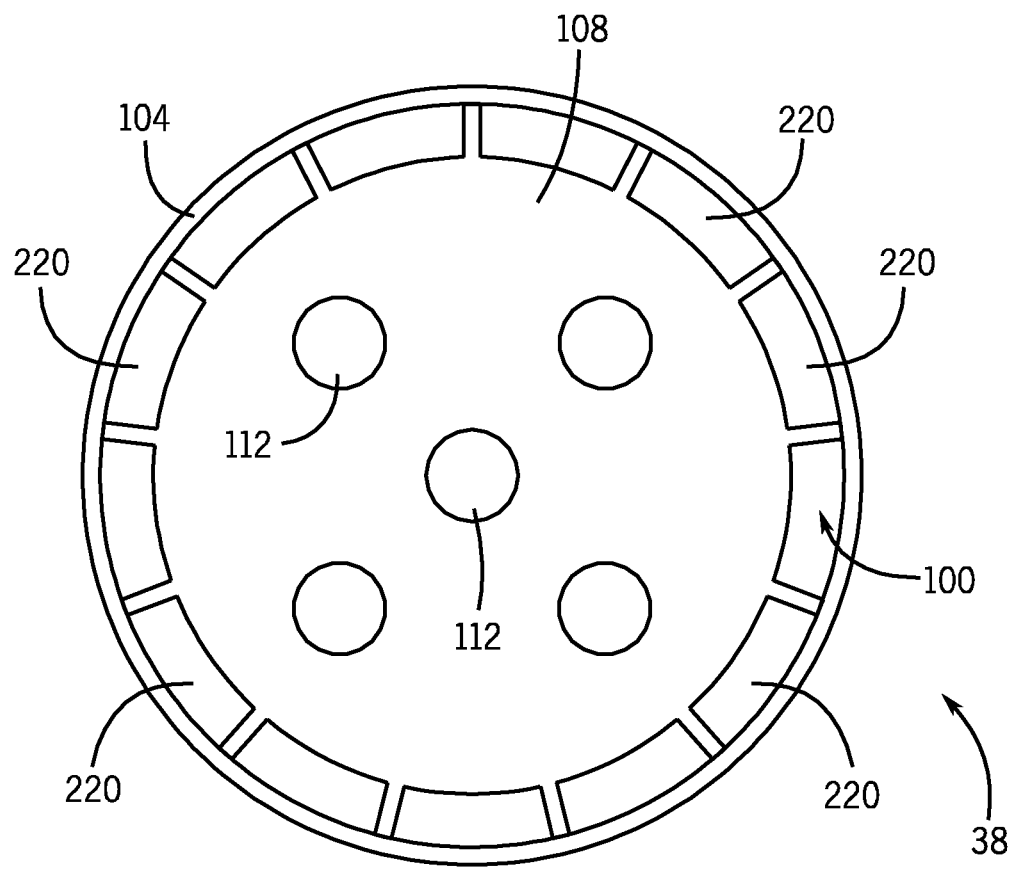
FIG. 7 is a schematic rear view of the combustor cap assembly with stiffening rib segments.

FIG. 7 is a rear view of the combustor cap assembly 38 having a stiffening rib 100 with stiffening rib segments 220. These stiffening rib segments 220 function in a manner similar to the continuous stiffening rib 100. The stiffening rib segments 220 increase resistance to damaging vibrations in components of the combustor cap assembly 38. As illustrated, the combustor cap assembly 38 includes thirteen stiffening rib segments 220 instead of the continuous stiffening rib 100, shown in FIG. 6. However, other embodiments may include different numbers of stiffening rib segments 220 (e.g., 2, 3, 4, 5, 10, 15, 20, or more) of equal or different arc lengths. These stiffening rib segments 220 may also have any number of different cross-sectional shapes similar to the shapes discussed in FIG. 5 (e.g., rectangular, square, semi-circular, triangular). In still other embodiments, the stiffening segments 220 may be the same or different from each other in material type. For example, the material in each of the segments 220 in FIG. 7 may differ in stiffness with respect to the others, thus optimizing stiffness and/or tuning out resonant frequencies at different locations on an individual component. The combustor cap assembly 38 may therefore optimize the use of stiffening rib segments 220 by selecting the number of segments, their cross-sectional shape, their material, and their locations for the desired level of stiffness in a particular area. For example, the combustor cap assembly 38 may include a certain number of stiffening rib segments 220 that have a particular cross-sectional shape and material on the inner sleeve 104; which may differ from the number, cross-sectional shape, and material of the segments 220 on the front plate 110, the rear plate 108, or the outer sleeve 102. The stiffening rib segments 220 may therefore optimize stiffness and/or tune out resonant frequencies in the combustor cap assembly 38 to increase resistance to damaging vibrational mode shapes in some or all of the components.

Figure 8:
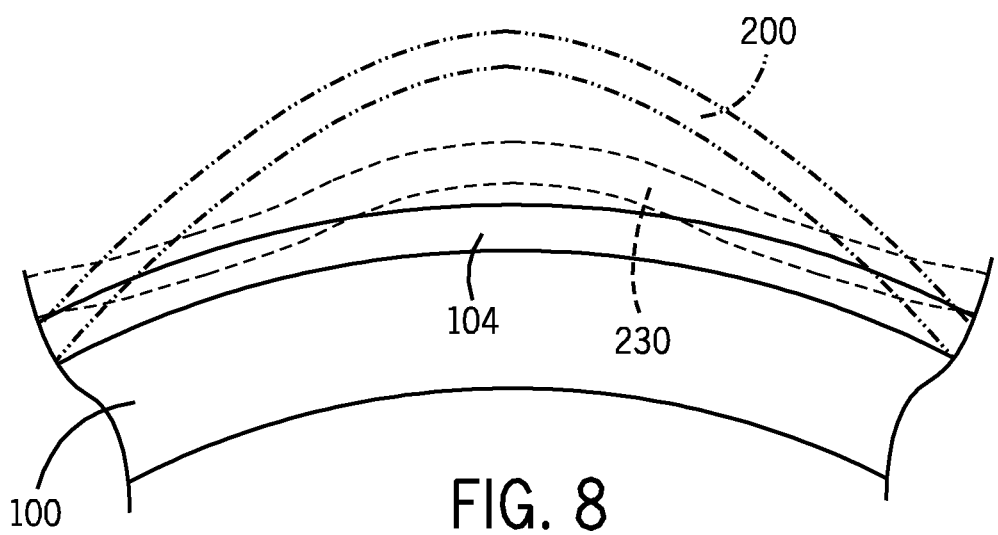
FIG. 8 is a sectional front view taken along line 8-8 of FIG. 6 illustrating mode shapes.

FIG. 8 is a sectional front view taken along line 8-8 of FIG. 6 illustrating mode shapes 200 and 230. As explained above, combustion dynamics in the gas turbine 10 may cause damaging vibrational mode shapes in the components of the combustor cap assembly 38 (e.g., outer sleeve 102, inner sleeve 104, rear plate 108, and front plate 110). As illustrated, the vibrational mode shape 200 may be a damage causing mode shape. The combustor cap assembly 38 may therefore include a stiffening rib 100 or stiffening rib segments 220 to reduce or eliminate the damaging vibrational mode shape 200. For example, after including the stiffening rib(s) 100 or stiffening rib segments 220, the vibrational mode shape 200 may turn into a non-damaging vibration mode shape 230 or even eliminate the vibrational mode shape 200 altogether.

Technical effects of the invention include the ability to reduce or eliminate damaging vibrational mode shapes in components of the combustor cap assembly using continuous or segmented stiffening ribs. The overall assembly stiffness or component stiffness is modified by incorporating continuous or segmented stiffening ribs of the appropriate material, cross-sectional shape, location, and number. The combustor cap assembly may also include stiffening ribs that increase vibrational resistance to combustion dynamics by tuning out or reducing resonant frequency vibrations in the combustor cap assembly 38 as a whole and/or its individual components. In this manner, the combustor cap assembly with stiffening ribs may reduce damaging vibrational mode shapes.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:
1. A system, comprising:
 a combustor cap assembly configured to mount in a combustor, the combustor cap assembly comprising:
  a first plate;
  a second plate axially offset relative to the first plate;
  a first fuel nozzle sleeve extending through the first and second plates;
  a first sleeve extending circumferentially around the first and second plates;
  a second sleeve extending circumferentially around the first sleeve at a radial offset from the first sleeve;
  a support structure extending radially between the first and second sleeves; and
  a first annular stiffening rib coupled to the combustor cap assembly, wherein the first annular stiffening rib extends circumferentially from the first sleeve or the second sleeve, and wherein the first annular stiffening rib is configured to damp resonant motion caused by combustion dynamics in the combustor.

2. The system of claim 1, wherein the first annular stiffening rib is coupled to an inner surface of the second sleeve.

3. The system of claim 1, wherein the first annular stiffening rib is coupled to an inner surface of the first sleeve.

4. The system of claim 1, wherein the first annular stiffening rib has a location, a radial height, an axial thickness, or a shape tuned to a resonant frequency of the combustion dynamics.

5. The system of claim 1, comprising a second stiffening rib coupled to the combustor cap assembly, wherein the second stiffening rib is configured to damp resonant motion caused by combustion dynamics in the combustor.

6. The system of claim 5, wherein the first annular stiffening rib is tuned to a first resonant frequency of the combustor cap assembly, and the second stiffening rib is tuned to a second resonant frequency of the combustor cap assembly.

7. The system of claim 1, comprising a first fuel nozzle disposed in the first fuel nozzle sleeve.

8. The system of claim 1, comprising the combustor having the combustor cap assembly.

9. The system of claim 8, comprising a gas turbine engine having the combustor with the combustor cap assembly.

10. A system, comprising:
a combustor cap assembly, comprising:
a first plate configured to divide a combustion chamber from a head end chamber of a combustor;
a first sleeve disposed about the first plate; and
a first annular stiffening rib directly coupled to the first sleeve of the combustor cap assembly, wherein the combustor cap assembly is configured to mount in a combustor, and the first annular stiffening rib is configured to damp vibration caused by combustion dynamics in the combustor.

11. The system of claim 10, wherein the first annular stiffening rib is tuned to a first resonant frequency of the combustor cap assembly.

12. The system of claim 11, comprising a second stiffening rib coupled to the combustor cap assembly, wherein the second stiffening rib is tuned to a second resonant frequency of the combustor cap assembly.

13. The system of claim 12, wherein the second annular stiffening rib is positioned at an axial end of the first or second sleeves.

14. The system of claim 10, comprising the combustor having the combustor cap assembly and a plurality of fuel nozzles coupled to the first plate.

15. The system of claim 14, comprising a gas turbine engine having the combustor with the combustor cap assembly and the plurality of fuel nozzles.

16. The system of claim 10, wherein the first annular stiffening rib is positioned at an axial end of the first sleeve.

17. The system of claim 10, wherein a second annular stiffening rib is coupled to the first plate.

18. The system of claim 10, wherein the first annular stiffening rib extends circumferentially about the first sleeve.

19. A method, comprising:
injecting a fuel from first and second fuel nozzles into a combustion chamber of a combustor, wherein the first and second fuel nozzles are supported by a combustor cap assembly disposed between the combustion chamber and a head end of the combustor, wherein the combustor cap assembly comprises first and second sleeves and first and second plates;
combusting the fuel in the combustion chamber of the combustor; and
reducing resonant motion of the combustor cap assembly caused by combustion dynamics associated with combusting the fuel using at least one annular stiffening rib coupled to the combustor cap assembly, wherein the at least one annular stiffening rib is tuned to at least one resonant frequency of the combustor cap assembly.

* * * * *